United States Patent [19]

Murphy

[11] 4,426,215
[45] Jan. 17, 1984

[54] METHOD OF FABRICATING A LOW LOSS FUSED BICONICAL TAPER FIBER OPTIC COUPLER

[75] Inventor: Kent A. Murphy, Roanoke, Va.

[73] Assignee: International Telephone and Telegraph Corporation, New York, N.Y.

[21] Appl. No.: 484,343

[22] Filed: Apr. 12, 1983

Related U.S. Application Data

[63] Continuation of Ser. No. 309,360, Oct. 7, 1981, abandoned.

[51] Int. Cl.$^3$ ..................... C03B 37/075; C03B 37/14
[52] U.S. Cl. ........................................ 65/4.21; 65/54; 65/55; 65/56
[58] Field of Search ................ 65/4.1, 4.2, 4.21, 56, 65/54, 55; 350/96.15, 96.21

[56] References Cited

U.S. PATENT DOCUMENTS

| | | | |
|---|---|---|---|
| 3,579,316 | 5/1971 | Dyott et al. | 65/4.21 |
| 3,825,319 | 7/1974 | Cook et al. | 65/4.2 X |
| 4,054,366 | 10/1977 | Barnoski et al. | 350/96.15 |
| 4,291,940 | 9/1981 | Kawasaki et al. | 65/4.2 X |
| 4,377,403 | 3/1983 | McLandrich | 65/4.21 X |

OTHER PUBLICATIONS

Rawson et al., "Star Couplers Using Fused . . . Fibers," Electronics Letters, vol. 14, No. 9, Apr. 27, 1978, pp. 274-275.

Rawson et al., "Bitaper Star Couplers . . .," Electronics Letters, vol. 15, No. 14, Jul. 5, 1979, pp. 432-433.

Johnson et al., "Low-Loss Reflection-Star Couplers . . . ," Appl. Phys. Lett., vol. 35, No. 7, Oct. 1, 1979, pp. 479-481.

Primary Examiner—Richard V. Fisher
Attorney, Agent, or Firm—John T. O'Halloran; Mary C. Werner

[57] ABSTRACT

A known low loss fused biconical taper fiber optic coupler is fabricating by heating and pulling a plurality of fused optical fibers which may be twisted to provide a minimum biconical taper region. One method of improving this known biconical taper coupler is to simultaneously heat and push the known coupler to form a glass ball in the minimum taper region and then simultaneously heat and pull the ball to provide the improved biconical taper coupler. Another method of improving the known biconical taper coupler is to score and pull the minimum taper region of the known coupler to separate the minimum taper region into two halves and then heat and push the two halves together to provide the improved biconical taper coupler.

6 Claims, 2 Drawing Figures

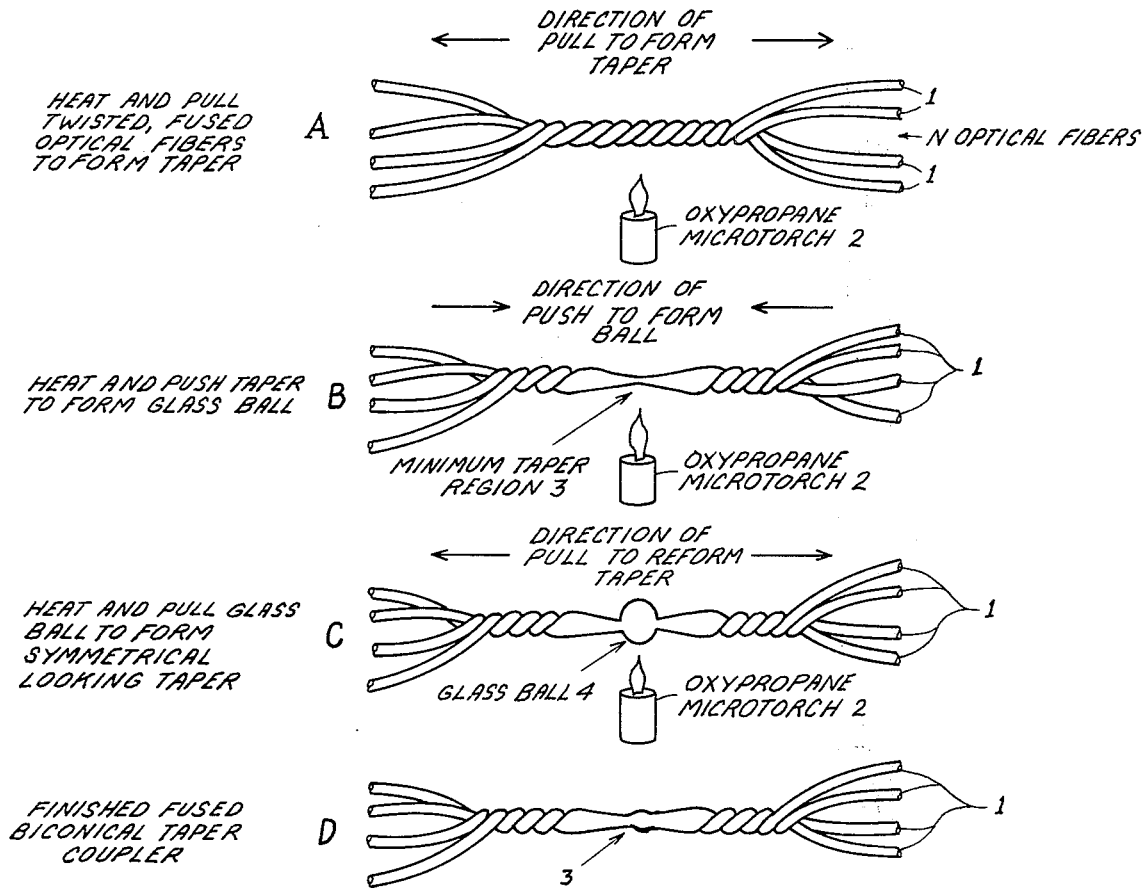
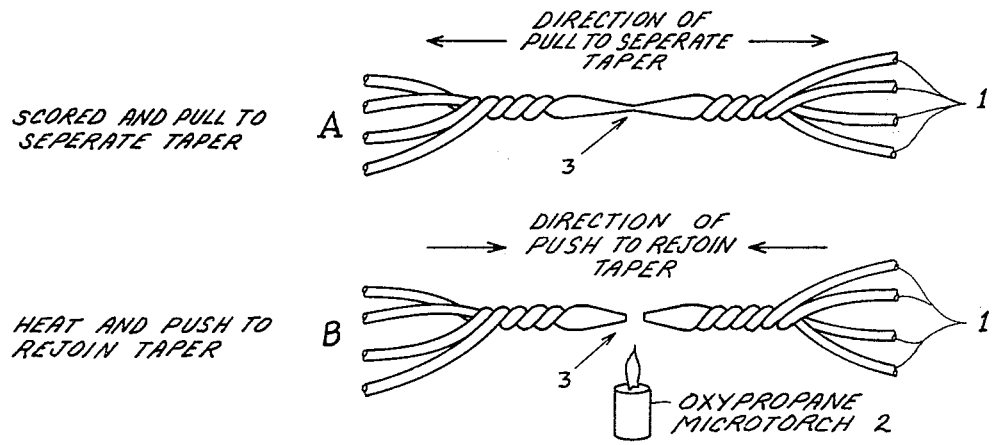

METHOD OF FABRICATING A LOW LOSS FUSED BICONICAL TAPER FIBER OPTIC COUPLER

This application is a continuation of application Ser. No. 309,360, filed Oct. 7, 1981, now abandoned.

BACKGROUND OF THE INVENTION

The present invention relates to fiber optic couplers and more particularly to a method of fabricating a low loss fused biconical taper fiber optic coupler.

Several published articles have described the fabrication of relatively low loss fused biconical taper (FBT) fiber optic couplers. These articles are as follows: D. C. Johnson, B. S. Kawasaki and K. O. Hill, "Low Loss Reflection Star Couplers for Optical Fiber Distribution Systems", Applied Physics Letters, Vol. 35(7), pages 479-481, Oct. 1, 1979; E. G. Rawson, A. B. Nafarrate, "Star Couplers Using Fused Biconically Tapered Multimode Fibers", Electronic Letters, Vol. 14, No. 9, Apr. 27, 1978; and E. G. Rawson, M. D. Bailey, "Bitaper Star Couplers with Up to 100 Fibre Channels", Electronic Letters, Vol. 15, No. 4, July 5, 1979. According to these articles the FBT couplers are fabricated by grouping any number, N, of optical fibers over some length, L, and twisting and fusing the fibers together with a heat source while simultaneously pulling the fibers to form a biconical taper of N fibers. Both reflection and transmission star couplers can be made using this described method.

Typically, couplers used in fiber optic systems are required to have an even distribution of power among the output ports of the coupler. An even distribution of the power has not been demonstrated for FBT star couplers with acceptable insertion losses using the conventional fabricating technique above described. This disadvantage appears to be caused by a preferential recoupling of light back into the excited fiber of the coupler. The excited fiber, referred to hereinafter as the throughput fiber on the output end, will always have a higher power level than any of the tapoff fibers and this difference between tapoff and throughput fibers will depend on the number N of fibers in the coupler. For couplers with greater than eight fibers, the throughput fiber will have significantly more power (usually greater than 50%) than any of the tapoff ports.

SUMMARY OF THE INVENTION

An object of the present invention is to provide a FBT fiber optic coupler that overcomes the above-mentioned disadvantages by eliminating the preferential recoupling effect of the throughput fiber and improving the overall uniformity of the FBT couplers by more than a factor of 2.

A feature of the present invention is the provision of a method of fabricating a low loss fused biconical taper fiber optic coupler comprising the steps of: forming a conventional low loss fused biconical taper fiber optic coupler having N optical fibers, where N is an integer greater than one; and deforming cores of the N fibers at a minimum taper region of the conventional coupler.

As can be seen, the technique of the present invention involves deforming, scrambling or mixing the fiber cores of the N optical fibers at the minimum taper region of a conventional coupler which will eliminate the preferential recoupling effect of the throughput fiber and will improve the overall uniformity of the FBT couplers by more than a factor of 2.

BRIEF DESCRIPTION OF THE DRAWING

Above-mentioned and other features and objects of this invention will become more apparent by reference to the following description taken in conjunction with the accompanying drawing, in which:

FIG. 1 illustrates the steps in one embodiment of a method of fabricating a low loss fused biconical taper fiber optic coupler in accordance with the principles of the present invention; and FIG. 2 illustrates certain steps of a second embodiment of a method of fabricating a low loss fused biconical taper fiber optic coupler in accordance with the principles of the present invention.

DESCRIPTION OF THE PREFERRED EMBODIMENTS

Before discussing the actual method and presenting experimental results, a brief definition of terms employed will be given.

Throughput Factor $T[I,J]$ = Optical Power Loss from input port J to output port I where:

$$T[I,J] = +10 \log \frac{P[I,J]}{P[J]}$$

where:

$P[I,J]$ = power out of port I for input port J; and
$P[J]$ = power injected into input port J.

Uniformity Factor $U[J]$ = Ratio of difference between maximum and minimum output power to maximum power for a given input port J $$U[J] = \frac{P[I,J]_{max} - P[I,J]_{min}}{P[I,J]_{max}} \times 100\%.$$

The invention described herein involves the formation of an FBT coupler using standard conventional techniques (twisting and tapering) and then modifying the taper region of the conventional taper to eliminate the preferential recoupling effects of the throughput fiber.

Table 1 shows a transmission matrix for a 32 port FBT transmission star using the standard conventional technique of forming the FBT transmission star. Ports corresponding to the throughput port for each injected port are circled to illustrate that the throughput fiber has significantly more power than all other tapoff fibers for any injected port (e.g., for the coupler presented here, output port 17 corresponds to input port 1, output 18 corresponds to input port 2, etc.). In general, the numbering system adopted here is such that port i and i+N/2 are the same fiber where j=1,2 ... N/2. If port i is the input port, port i+N/2 is the throughput port and vice versa.

TABLE I

STANDARD TECHNIQUE
COUPLING EFFICIENCY T[I,J] in dB

| OUTPUT PORT I | INPUT J | | | | | | | | |
|---|---|---|---|---|---|---|---|---|---|
| | 1 | 2 | 3 | 4 | 17 | 18 | 19 | 20 | A[I] |
| 1  | * | * | * | * | −11.3 | −14.6 | −13.4 | −14.2 | −13.4 |
| 2  | * | * | * | * | −13.9 | −10.1 | −12.5 | −13.3 | −12.4 |
| 3  | * | * | * | * | −15.0 | −14.8 | −11.1 | −14.3 | −13.8 |
| 4  | * | * | * | * | −14.0 | −13.8 | −12.5 | −10.8 | −12.7 |
| 5  | * | * | * | * | −13.8 | −13.5 | −12.3 | −13.1 | −13.2 |
| 6  | * | * | * | * | −14.0 | −13.7 | −12.5 | −13.4 | −13.4 |
| 7  | * | * | * | * | −13.7 | −13.5 | −12.2 | −13.1 | −13.1 |
| 8  | * | * | * | * | −13.9 | −13.8 | −12.5 | −13.4 | −13.4 |
| 9  | * | * | * | * | −13.7 | −13.5 | −12.2 | −13.2 | −13.2 |
| 10 | * | * | * | * | −13.6 | −13.4 | −12.1 | −13.0 | −13.0 |
| 11 | * | * | * | * | −14.0 | −13.8 | −12.5 | −13.4 | −13.4 |
| 12 | * | * | * | * | −14.3 | −14.2 | −12.9 | −13.8 | −13.8 |
| 13 | * | * | * | * | −14.0 | −13.8 | −12.5 | −13.4 | −13.4 |
| 14 | * | * | * | * | −14.9 | −14.7 | −13.5 | −14.3 | −14.4 |
| 15 | * | * | * | * | −14.2 | −14.0 | −12.7 | −13.6 | −13.6 |
| 16 | * | * | * | * | −14.1 | −13.9 | −12.7 | −13.6 | −13.6 |
| 17 | −11.1 | −14.4 | −13.2 | −14.4 | * | * | * | * | −13.3 |
| 18 | −14.2 | −11.0 | −12.8 | −13.9 | * | * | * | * | −13.0 |
| 19 | −14.9 | −14.5 | − 9.9 | −14.4 | * | * | * | * | −13.4 |
| 20 | −14.1 | −13.8 | −12.5 | −11.5 | * | * | * | * | −13.0 |
| 21 | −13.8 | −13.4 | −12.2 | −13.4 | * | * | * | * | −13.2 |
| 22 | −14.5 | −14.2 | −13.0 | −14.2 | * | * | * | * | −14.0 |
| 23 | −13.6 | −13.3 | −12.1 | −13.2 | * | * | * | * | −13.0 |
| 24 | −14.3 | −13.9 | −12.7 | −13.9 | * | * | * | * | −13.7 |
| 25 | −14.3 | −13.9 | −12.8 | −13.9 | * | * | * | * | −13.7 |
| 26 | −13.6 | −13.2 | −12.1 | −13.2 | * | * | * | * | −13.0 |
| 27 | −14.2 | −13.8 | −12.6 | −13.8 | * | * | * | * | −13.6 |
| 28 | −14.2 | −13.8 | −12.6 | −13.8 | * | * | * | * | −13.6 |
| 29 | −14.2 | −13.8 | −12.6 | −13.8 | * | * | * | * | −13.6 |
| 30 | −13.5 | −13.1 | −11.9 | −13.1 | * | * | * | * | −12.9 |
| 31 | −14.4 | −14.1 | −12.8 | −14.1 | * | * | * | * | −13.8 |
| 32 | −14.1 | −13.7 | −12.6 | −13.7 | * | * | * | * | −13.5 |
| U(J) | 58% | 55% | 53% | 49% | 57% | 66% | 43% | 56% | |
| A(J) | −13.9 | −13.6 | −12.4 | −13.6 | −13.9 | −13.7 | −12.5 | −13.4 | −13.4 |

Referring back to Table I, the uniformity factor, U[J], for each of the input ports is shown in the next to the last row of the matrix. These numbers range from 43% to as high as 58% and the highest port in each case is the throughput port. Table II shows the transmission matrix for the same coupler after the taper region has been modified by the technique described hereinbelow which is the invention of the instant application. As can be seen, the optical signal levels of the throughput ports (circled) have been brought down into the range of the tapoff ports. Uniformities range from 24% to 30%. The limiting factor for uniformity is no longer the "throughput fiber effect", but can now be attributed to other factors including: (1) taper symmetry; (2) optical fiber geometric tolerances and (3) measurement station tolerances.

TABLE II

MODIFIED TECHNIQUE
COUPLING EFFICIENT T[I,J,] in dB

| OUTPUT PORT I | INPUT J | | | | | | | | |
|---|---|---|---|---|---|---|---|---|---|
| | 1 | 2 | 3 | 4 | 17 | 18 | 19 | 20 | A[I] |
| 1  | * | * | * | * | −14.8 | −14.8 | −13.7 | −14.6 | −14.5 |
| 2  | * | * | * | * | −14.1 | −13.6 | −12.8 | −13.6 | −13.5 |
| 3  | * | * | * | * | −15.3 | −15.1 | −13.8 | −14.8 | −14.7 |
| 4  | * | * | * | * | −14.3 | −14.1 | −12.5 | −13.7 | −13.6 |
| 5  | * | * | * | * | −14.1 | −13.8 | −12.7 | −13.4 | −13.5 |
| 6  | * | * | * | * | −14.2 | −14.0 | −12.9 | −13.7 | −13.7 |
| 7  | * | * | * | * | −14.0 | −13.7 | −12.6 | −13.5 | −13.4 |
| 8  | * | * | * | * | −14.2 | −14.0 | −12.9 | −13.7 | −13.7 |
| 9  | * | * | * | * | −13.9 | −13.7 | −12.6 | −13.5 | −13.4 |
| 10 | * | * | * | * | −13.8 | −13.6 | −12.5 | −13.3 | −13.3 |
| 11 | * | * | * | * | −14.2 | −14.0 | −12.8 | −13.7 | −13.7 |
| 12 | * | * | * | * | −14.5 | −14.3 | −13.2 | −14.0 | −14.0 |
| 13 | * | * | * | * | −14.2 | −14.0 | −12.9 | −13.7 | −13.7 |
| 14 | * | * | * | * | −15.1 | −14.9 | −13.6 | −14.6 | −14.6 |
| 15 | * | * | * | * | −14.4 | −14.2 | −13.1 | −14.0 | −13.9 |
| 16 | * | * | * | * | −14.4 | −14.1 | −13.0 | −13.9 | −13.8 |
| 17 | −14.7 | −14.6 | −13.4 | −14.8 | * | * | * | * | −14.4 |
| 18 | −14.5 | −14.0 | −13.0 | −14.3 | * | * | * | * | −13.9 |
| 19 | −15.1 | −14.9 | −13.3 | −14.5 | * | * | * | * | −14.5 |
| 20 | −14.4 | −14.1 | −12.9 | −14.1 | * | * | * | * | −13.9 |
| 21 | −14.1 | −13.7 | −12.6 | −13.9 | * | * | * | * | −13.6 |
| 22 | −14.8 | −14.5 | −13.3 | −14.5 | * | * | * | * | −14.2 |
| 23 | −13.8 | −13.5 | −12.3 | −13.5 | * | * | * | * | −13.3 |
| 24 | −14.5 | −14.2 | −13.0 | −14.3 | * | * | * | * | −14.0 |

TABLE II-continued

MODIFIED TECHNIQUE
COUPLING EFFICIENT T[I,J,] in dB

| OUTPUT PORT I | INPUT J | | | | | | | | A[I] |
|---|---|---|---|---|---|---|---|---|---|
| | 1 | 2 | 3 | 4 | 17 | 18 | 19 | 20 | |
| 25 | −14.4 | −14.2 | −13.0 | −14.3 | * | * | * | * | −14.0 |
| 26 | −13.7 | −13.5 | −12.3 | −13.5 | * | * | * | * | −13.3 |
| 27 | −14.3 | −14.1 | −12.8 | −14.1 | * | * | * | * | −13.8 |
| 28 | −14.3 | −14.1 | −12.9 | −14.2 | * | * | * | * | −13.9 |
| 29 | −14.3 | −14.0 | −12.8 | −14.1 | * | * | * | * | −13.8 |
| 30 | −13.6 | −13.4 | −12.2 | −13.4 | * | * | * | * | −13.1 |
| 31 | −14.7 | −14.4 | −12.9 | −14.4 | * | * | * | * | −14.1 |
| 32 | −14.3 | −14.0 | −12.8 | −14.1 | * | * | * | * | −13.6 |
| U(J) | 30% | 29% | 24% | 27% | 29% | 30% | 27% | 28% | |
| A(J) | −14.3 | −14.1 | −12.0 | −14.1 | −14.3 | −14.1 | −13.0 | −13.9 | −13.8 |

It is clearly shown in Tables I and II that the coupler modified in the taper region in accordance with the principles of the present invention maintains desired throughput factors and significantly reduce the uniformity factor and, hence, the optical signal range. This effect is highly desirable from the system standpoint.

The actual procedure will now be described. As shown in FIG. 1(A), N optical fibers are fabricated utilizing the conventional techniques, namely, heating the fibers such as by an oxypropane microtorch 2, twisting and fusing the optical fibers while simultaneously pulling them to provide the minimum taper region 3 as illustrated in FIG. 1(B). The next step includes reversing the tapering machine (not shown) which provides the necessary pull for the tapering of the twisted and fused N optical fibers 1, to push the minimum taper region 3 while simultaneously heating this region by microtorch 2 to form a glass ball 4 as shown in FIG. 1(C) so as to deform the cores of the N fibers 1. The ball of FIG. 1(C) is then heated by microtorch 2 and again pulled until the desired optical coupler performance is achieved as shown in FIG. 1(D).

An alternative method is available, certain steps of which are shown in FIG. 2. The configuration formed using the steps of FIG. 1 up to FIG. 1(B) to provide the minimum taper region 3 is the same in the method according to FIG. 2 with the result being shown in FIG. 2(A). The minimum taper region 3 is scored with a diamond and then pulled to separate or break the taper as shown in FIG. 2(B). The two halves are then pushed together and fused with the oxypropane torch 2 to rejoin the taper and provide a structure as shown in FIG. 1(D).

While I have described above the principles of my invention in connection with specific apparatus, it is to be clearly understood that this description is made only by way of example and not as a limitation to the scope of my invention as set forth in the objects thereof and in the accompanying claims.

I claim:

1. A method of fabricating a low loss fused biconical taper fiber optic coupler comprising the steps of:

simultaneously heating and pulling N optical fibers to provide a minimum biconical taper region wherein said fibers are fused, where N is an integer greater than one; and deforming cores of said N fibers at said minimum taper region, said step of deforming including a pushing step at said minimum taper region.

2. The method according to claim 1 further comprising the step of twisting said optical fibers prior to heating and pulling said fibers to provide the minimum biconical taper region.

3. The method according to claim 1 wherein said step of deforming includes the steps of heating said minimum region, pushing said heated minimum region to form a glass ball thereat, heating said glass ball, and pulling said heated glass ball to provide a symmetrical looking taper in said minimum region.

4. The method according to claim 3 further comprising the step of twisting said optical fibers prior to heating and pulling said fibers to provide the minimum biconical taper region.

5. A method of fabricating a low loss fused biconical taper fiber optic coupler comprising the steps of:

simultaneously heating and pulling N optical fibers to provide a minimum biconical taper region wherein said fibers are fused, where n is an integer greater than one; and deforming cores of said N fibers at said minimum taper region, said step of deforming including the steps of:

scoring said minimum region, pulling said scored minimum region for separation thereof, heating said separated minimum region, and pushing said heated separated minimum region together to rejoin said separated minimum region.

6. The method according to claim 5 further comprising the step of twisting said optical fibers prior to heating and pulling said fibers to provide the minimum biconical taper region.

* * * * *

UNITED STATES PATENT AND TRADEMARK OFFICE
CERTIFICATE OF CORRECTION

PATENT NO. : 4,426,215
DATED : January 17, 1984
INVENTOR(S) : Kent A. Murphy

It is certified that error appears in the above—identified patent and that said Letters Patent is hereby corrected as shown below:

Column 1, after line 6, insert, --The Government has rights in this invention pursuant to Contracts Nos. N00173-80-C-0047 and N00173-80-C-0027 awarded by the Department of the Navy.--

Signed and Sealed this

Twenty-fourth Day of February, 1987

*Attest:*

DONALD J. QUIGG

*Attesting Officer*  *Commissioner of Patents and Trademarks*